United States Patent Office 3,375,580
Patented Apr. 2, 1968

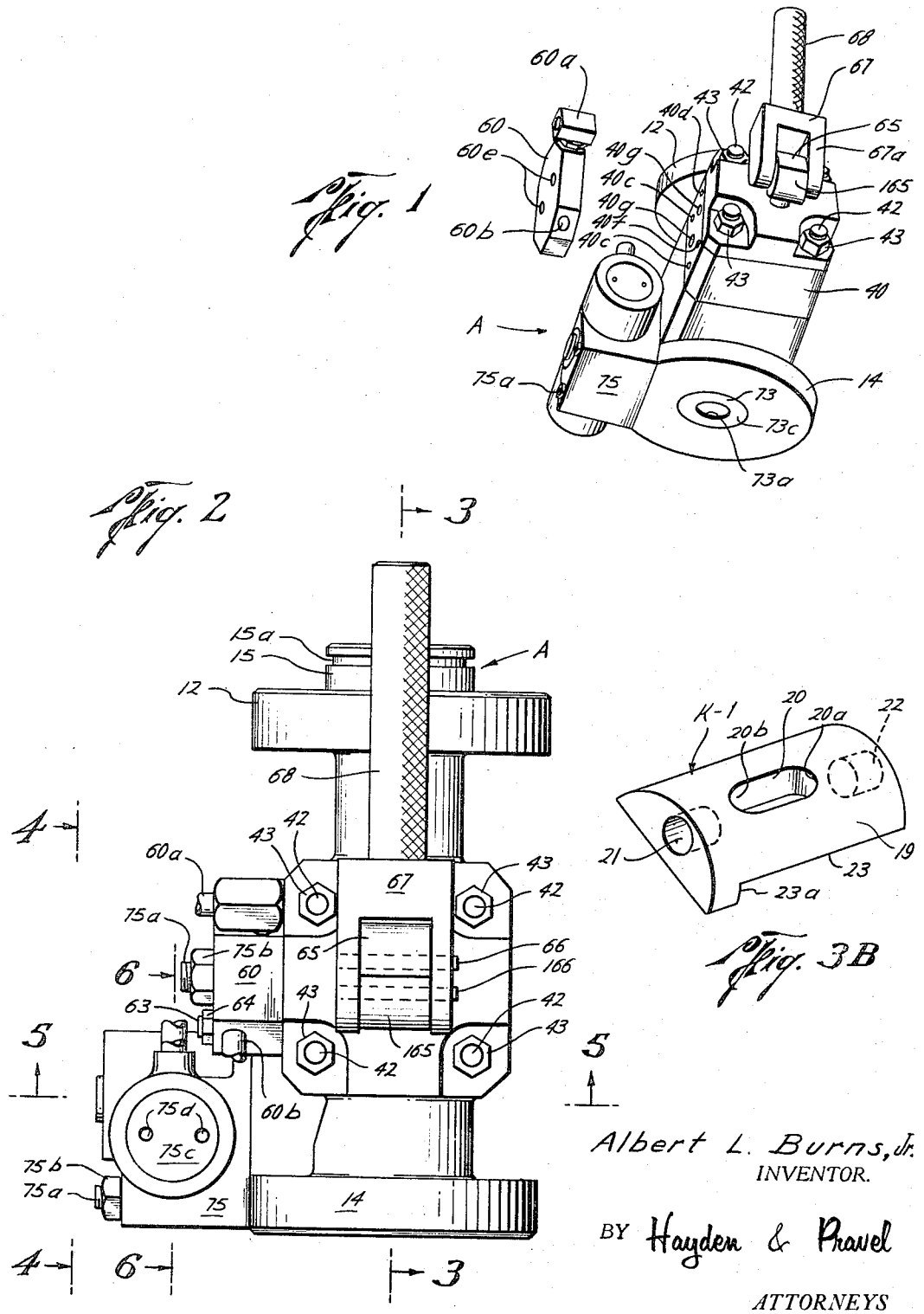

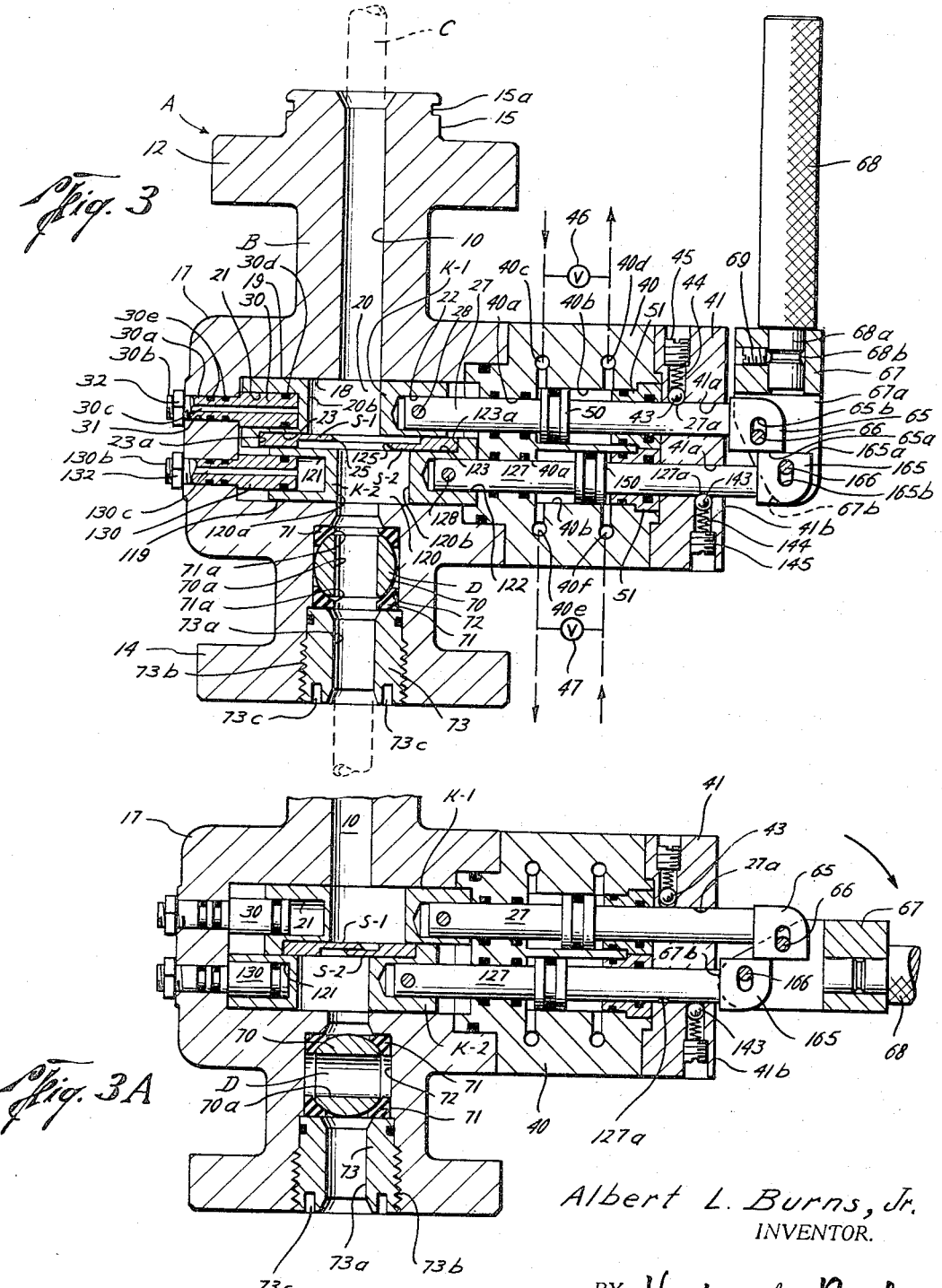

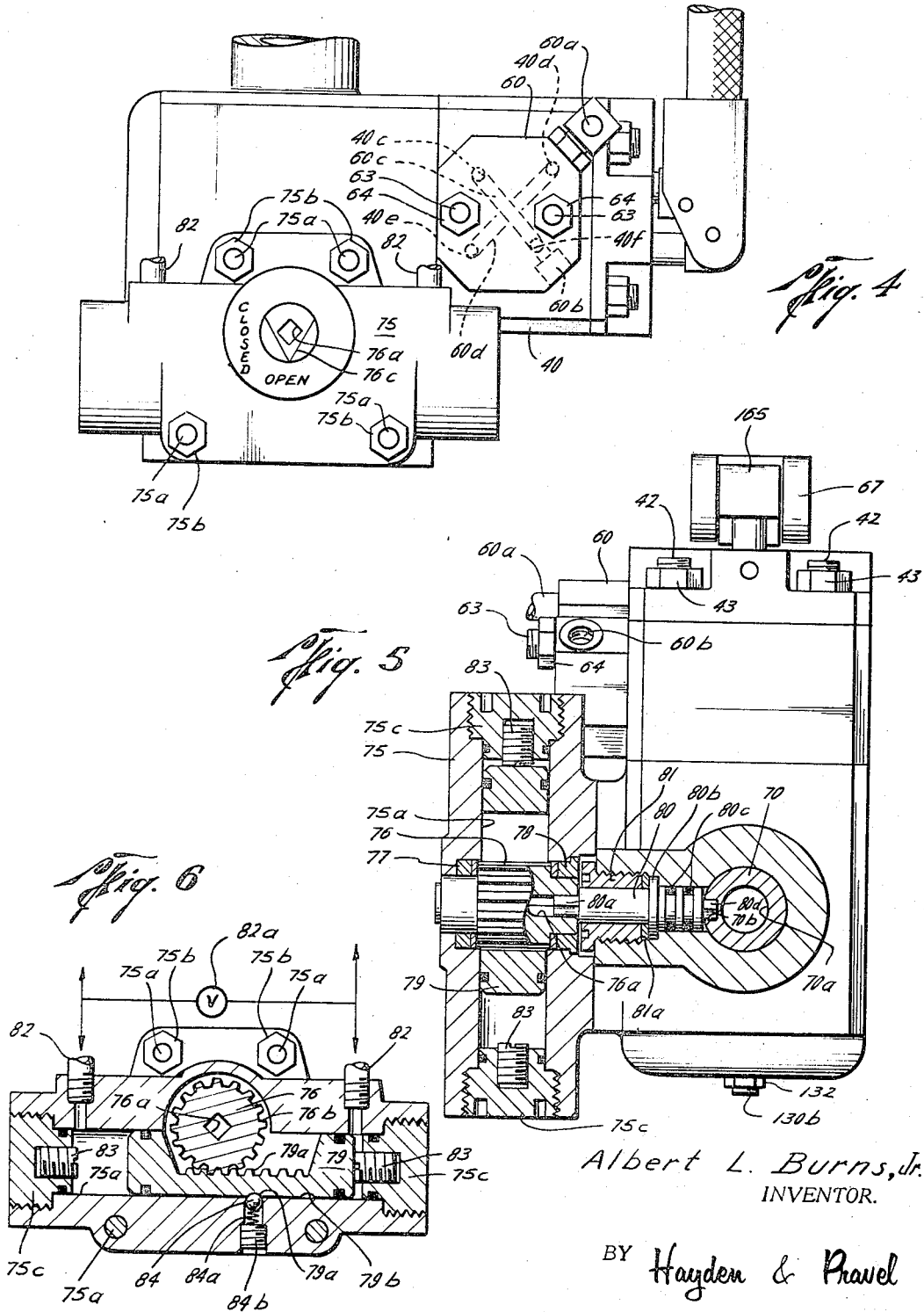

3,375,580
SHEAR AND SEAL VALVE UNIT
Albert L. Burns, Jr., Houston, Tex., assignor to Bowen Tools, Inc., a corporation of Texas
Filed July 29, 1966, Ser. No. 568,960
10 Claims. (Cl. 30—228)

This invention relates to a shear and seal valve unit which is adapted to be used with a submarine antenna cable or similar elongate element.

Some submarines are equipped with an antenna cable which is fed out through the hull and is floated or otherwise disposed at or near the surface of the water in which the submarine is located. Should the portion of the cable which is externally of the submarine hull become fouled, the present invention makes it possible to quickly shear the cable and close a valve to free the submarine from the external portion of the cable and prevent the entry of sea water into the hull.

It is therefore an object of this invention to provide a new and improved apparatus for providing a positive rapid shearing of an antenna cable or similar elongate element.

Another object of this invention is to provide a new and improved apparatus having a longitudinal opening through which an elongate element is adapted to extend and wherein a shear and valve are provided in a unit for shearing the elongate element and for closing the longitudinal opening.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown, and wherein:

FIG. 1 is an isometric view of the apparatus of this invention, with a portion thereof removed in an exploded position;

FIG. 2 is an elevation of the apparatus or unit of the present invention;

FIG. 3 is a vertical sectional view of the apparatus of the present invention taken on line 3—3 of FIG. 2 illustrating the shearing knives in the open or retracted position and the valve in the open position;

FIG. 3A is a view similar to FIG. 3 but illustrating the shearing knives in the cutting position and the valve in the closed position;

FIG. 3B is an isometric view of a support element for a shear knife of the present invention;

FIG. 4 is a side view of the apparatus or unit taken on line 4—4 of FIG. 2;

FIG. 5 is a view taken on line 5—5 of FIG. 2 and illustrating certain details with respect to the valve of the unit; and FIG. 6 is a view taken on line 6—6 of FIG. 2 further illustrating the details of the apparatus for operating the valve of the present invention.

In the drawings, the letter A designates generally the apparatus of this invention, which includes a body B having a longitudinal opening or bore 10 therethrough for the positioning and longitudinal movement of an elongate element such as an antenna cable C (dotted lines in FIG. 3). Briefly, the apparatus A of this invention includes a pair of shear knives S-1 and S-2 which is adapted to move towards and away from each other for effecting a cutting or severing of an elongate element such as an antenna cable C disposed in the longitudinal opening 10. The apparatus or unit A also has a valve D therewith which is adapted to provide a full opening therethrough in alignment with the longitudinal opening 10, as will be more fully explained, and which is also adapted to be moved to a closed position for closing off the longitudinal opening 10 when the antenna cable C or other elongate element is moved away from the valve D (FIG. 3A). The apparatus A is especially suitable for use in conjunction with a submarine installation wherein an antenna cable is moved from internally of the submarine to the water externally thereof through the body B, although it is to be understood that the invention is not limited thereto.

Considering the invention more in detail, the body B includes an upper external flange 12 and a lower external flange 14 which may be used for mounting the apparatus or unit A as desired. To facilitate the mounting of the unit A in the hull of a submarine, the body B has an extension 15 with a groove 15a for receiving an O-ring or other suitable seal ring, which extension is adapted to be positioned into an opening in a hull insert (not shown) or other fitting mounted in the hull of the submarine. The upper flange 12 is thus secured to the hull insert and thereby to the submarine hull using flange bolts, welding, or any other suitable securing means. The lower flange 14 is connected to a seal assembly of any suitable construction (not shown) by flange bolts, welding, or other securing means so that an annular fluid-tight seal is maintained around the cable C at all times for preventing sea water from passing around such cable C when the valve D is open.

The body B has a central lateral enlargement 17 which has a lateral opening 18 which intersects with the longitudinal opening 10 of the body B. A pair of knife support members K-1 and K-2 is disposed in the lateral opening 18 for lateral movement with respect to the longitudinal bore 10, as will be more evident hereinafter. Details of the knife support member K-1 may be seen in FIG. 3B as well as FIGS. 3 and 3A. The knife support member K-1 has an upper curved surface 19 which is adapted to engage the upper surface of the bore 18. An elongate opening 20 is provided through the member K-1 through which the elongate element C extends when the members K-1 and K-2 are in the open or retracted position of FIG. 3. It is to be noted that the distance from one end wall 20a to the other end wall 20b of the opening 20 is greater than the diameter of the longitudinal opening 10, the purpose of which will be more evident hereinafter. The member K-1 is formed with laterally extending bores 21 and 22 in each of the ends. The lower surface 23 of the member K-1 is preferably flat except for a shoulder 23a which is provided for abutment by the shear knife S-1 (FIG. 3). The shear knife S-1 may be formed integrally with the support member K-1 or it may be connected thereto by means of screws or other retaining means (not shown) of conventional construction.

The knife S-1 has a curved or semicircular cutting edge 25 which extends inwardly from the wall 20b a distance which is over half of the diameter of the longitudinal opening 10 so that clearance is provided for allowing the knife S-1 to pass slightly more than halfway through the antenna C or other object to be sheared, as will be more evident hereinafter. It is also to be noted that the knife edge 25 is retracted out of alignment wtih the longitudinal bore 10 when the wall 20a is substantially in alignment therewith so that the knife edge 25 does not contact the antenna C or the elongate object passing longitudinally through the longitudinal opening 10 until such time as cutting is desired.

For the purpose of moving the knife support means K-1 and the knife S-1 therewith laterally with respect to the longitudinal opening 10 so as to effect a cutting of the antenna C or other elongate object and for also returning the knife S-1 to the retracted position, a rod 27 is connected to the member K-1 by positioning the rod 27 in the bore 22 and maintaining same connected with a connecting pin 28 or other suitable attaching means.

In the preferred form of the invention, a guide rod or element 30 is disposed in the bore 21 at the other end of the knife support member K-1. The guide element or member 30 has a reduced diameter portion 38a which extends through an opening 31 in the body B. The reduced diameter portion 30a has threads 30b formed on its outer portion for receiving a retaining nut 32 or other similar securing means so as to hold the guide rod 30 in a secure position with respect to the housing B and so that the knife member K-1 may move laterally with respect thereto. A longitudinal passage 30c is formed throughout the length of the guide rod or member 30 which establishes communication from the interior of the bore 21 to atmosphere or some point of reduced pressure. Suitable seal rings 30d and 30e are provided to seal around the guide member 30. The provision of the guide member 30 within the bore 21 exposes the cross-sectional area of the bore 21 to a reduced pressure which area is equal to the cross-sectional area of the upper bore 41a so that the pressure within the longitudinal opening 10 is applied to substantially equal external surfaces of the cutter member K-1 to neutralize the effect of such pressure and so as to prevent the knife member K-1 from being shifted due to pressure in the longitudinal opening 10.

The knife support member K-2 is identical with the knife support member K-1 in the preferred form of the invention, except that it is upside down as compared to the member K-1. Therefore, for ease of reference, the parts of the member K-2 are numbered in the same manner as the parts of the member K-1, except that they are preceded by the numeral 1. Thus, the member K-2 has a longitudinal opening 120 therethrough which has side walls 120a and 120b. The end surface 120a is substantially in alignment with one of the walls of the longitudinal opening 10 as best seen in FIG. 3 when the knives S-1 and S-2 are in the retracted position of FIG. 3. The end surface 120b of the opening 120 is disposed outwardly from the knife edge 125 of the knife S-2 a distance which is slightly more than one-half of the diameter of the longitudinal opening 10 so as to allow for clearance for the cutting action which is illustrated in FIG. 3A.

The lower surface 119 of the knife member K-2 is formed of a curve or semicylindrical shape as illustrated in connection with the surface 19 in FIG. 3B. The knife S-2 is mounted in the same manner as explained in connection with the knife S-1 on the flat surface 123 and against the abutment 123a of the member K-2. An operating rod 127 is disposed within the bore 122 and is secured thereto by any suitable means such as a connecting pin 128. A guide rod or element 130 is disposed within the bore 121, and it is securely mounted to the body B by a nut 132 threaded upon external threads 130b. Communication is established from the bore 121 to the atmosphere by means of the longitudinal passage 130c throughout the length of the member 130. A pressure balance is created with respect to the knife support member K-2 in the same manner as described with respect to the member K-1 by making the cross-sectional area of the bore 121 equal to the cross-sectional area of the lower bore 41a. Because of such pressure balance, the fluid pressure in the bore 10 does not provide a retarding force to the movement of the support K-2 when bringing the knife S-2 into the cutting position.

For the purpose of moving the rods 27 and 127 so as to shift the knives S-1 and S-2 from the retracted position of FIG. 3 to the cutting position of FIG. 3A and to then return same to the retracted position of FIG. 3, the preferred form of the invention illustrated in the drawings has both a hydraulic system and a mechanical arrangement. The hydraulic system includes a body extension 40 and a closure 41, both of which are secured to the body B, preferably by threaded studs 42 which extend from the body B through openings in the body extension 40 and the closure 41 so that nuts 43 (FIGS. 1 and 2) may be used to removably hold the structure together as a unit.

The body 40 is provided with a pair of bores 40a through which the shafts or rods 27 and 127 extend for reciprocal movement. The body extension 40 also has enlarged counterbores 40b which serve as piston chambers for pistons 50 and 150 carried on rods 27 and 127, respectively.

At the outer ends of the chambers or cylinders 40b, annular seal plugs 51 are provided for sealing engagement with the shafts 27 and 127 at their outer extremities. The shafts 27 and 127 actually extend through such annular plugs 51 and then through holes 41a in the closure or end plate 41. To assist in holding the shear knives S-1 and S-2 in the retracted or open position shown in FIG. 3, the closure 41 preferably has a spring mounted ball 43 which is urged towards the shaft or rod 27 by a spring 44 which is adjustably held in place by a threaded retainer plug 45. The ball 43 extends into a detent 27a when the knife S-1 is in the open or retracted position. A similar ball 143 with a spring 144 and a retainer plug 145 is provided in the closure or end plate 41 for resiliently urging the ball 143 into a detent 127a in the rod 127 when the knife S-2 is in the open or retracted position (FIG. 3).

For hydraulically operating the knives S-1 and S-2, any suitable fluid pressure system is connected for introducing fluid under pressure to the pistons 50 and 150. In the embodiment illustrated in the drawings, fluid passages 40c and 40d are provided for the inlet and outlet of fluid pressure to the cylinder or chamber 40b for controlling the movement of the piston 50. Similarly, fluid passages 40e and 40f are provided for introducing and discharging fluid from the chamber or cylinder 40b in which the piston 150 is disposed. Dotted lines are illustrated in FIG. 3 to indicate the inlet and outlet (during shearing action as later explained) of fluid through the respective passages 40c through 40f from any suitable source of fluid pressure such as a fluid pressure pump or other hydraulic type of unit. A bypass valve is schematically indicated at 46 in the circuit leading to the piston 50, and a similar bypass valve 47 is indicated in the fluid circuit leading to the piston 150. These valves 46 and 47 are normally closed when the unit is being operated hydraulically, but they are opened to bypass fluid when the pistons 50 and 150 are operated mechanically, as will be more evident hereinafter.

To reduce the number of flow lines leading to the apparatus A to a minimum, a manifold 60 (FIGS. 1, 2, and 4) is provided, having inlets 60a and 60b which lead to a hydraulic or fluid pressure system. The manifold is drilled internally as indicated by the dotted lines in FIG. 4 with a passage 60c leading from the inlet 60b disposed in elevation above another passage 60d which leads from the inlet 60a. Thus, the passages 60d and 60c are not in communication although they do cross each other at different elevations within the body of the manifold 60. The passage 60c communicates with openings 40c and 40f (FIG. 4) while the passage 60d communicates with the passages 40d and 40e (FIG. 4). Thus, when the pistons 50 and 150 are being moved from the open or retracted position of FIG. 3 to the cutting position of FIG. 3A, fluid pressure is introduced through the opening or line 60b to the passages 40c and 40f, while at the same time the passages 40d and 40e are discharging fluid from the cylinders 40b through the passage 60d to the outlet 60a. The reverse occurs when the pistons 50 and 150 are returned to the open or retracted position, as will be well understood.

The manifold 60 may be secured to the body extension 40 by any suitable means such as studs 62 which extend into threaded openings 40g (FIG. 1) and through suitable openings 60e in the manifold for receiving nuts 64 thereon.

For the purpose of mechanically moving the knives S-1 and S-2 towards each other for cutting the antenna C or other elongate element within the longitudinal opening 10 and for subsequently retracting such knives S-1 and S-2 back to the retracted or open position of FIG. 3, the rods or shafts 27 and 127 extend outwardly of the end plate or closure 41 and have pivot blocks 65 and 165 suitably secured on the rods 27 and 127, respectively. The pivot blocks 65 and 165 are preferably formed with mating flat contacting surfaces 65a and 165a which slide relative to each other and provide a sliding contact surface therebetween during the longitudinal movements of the rods 27 and 127. The pivot blocks 65 and 165 are also provided with elongated slots 65b and 165b, respectively, for receiving pivot pins 66 and 166 carried between the legs 67a of a yoke 67 to which a lever 68 is secured. The lever 68 may be removably secured to the yoke 67 by any suitable means, but as illustrated, the lever 68 has a reduced diameter connector end 68a with an annular groove 68b for receiving a set screw 69. It is to be noted that the yoke 67 is formed with an inclined or tapered cam face or surface 67b which is adapted to engage the end surface 41b of the closure or end plate 41 to provide a fulcrum action for the lever 68 in effecting the final cutting action with the blades or shear knives S-1 and S-2 when severing the antenna or other elongate element C. Such additional mechanical advantage at the end of the cutting action is of particular value when severing an antenna which has the copper wires or other relatively tough center portion which is engaged at approximately the time of the contact between the cam surface 67b and end surface 41b, as illustrated in FIG. 3A, and as will be more evident hereinafter.

The lever 68 is rotated from the substantially vertical position of FIG. 3 through approximately 90 degrees to the substantially horizontal position of FIG. 3A. During such movement, the pivot block 165 and the rod 127 therewith together with the shear knife S-2 are moved inwardly towards the longitudinal bore or opening 10. The pivot block 65 is moved outwardly together with the rod 27 so as to pull the shear knife S-1 into the opening 10. During the final cutting action, the shear knives S-1 and S-2 cross each other at the longitudinal center line of the longitudinal opening 10, and the cam action provided by the engagement of the cam surface 67b and the surface 41b provides a maximum cutting force with the lever 68 and a shifting of the pins 66 and 166 from the position in FIG. 3 to that of FIG. 3A. The reverse movement takes place when returning the knives S-1 and S-2 to their open or retracted position by a movement of the lever 68 from the position of FIG. 3A to the substantially vertical position of FIG. 3.

Considering now the details of the valve D forming a part of the unit A of this invention, such valve D includes a rotatable valve element 70 having a longitudinal opening 70a therethrough which is adapted to be moved from a position in alignment with the longitudinal opening 10 (FIG. 3) to a closed position substantially perpendicular to the longitudinal opening 10 (FIG. 3A). In the preferred form of the invention, the valve element 70 is mounted for rotation on a pair of valve seats 71 which are disposed in an annular lateral recess 72 surrounding longitudinal opening 10 of body B. Such valve seats 71 are preferably annular with an opening 71a therethrough in alignment with the opening 70a when the valve element 70 is in the open position (FIG. 3). The valve seat 71 may be made of various materials, but preferably when the valve element 70 is formed of metal, the valve seats 71 are formed of Teflon so as to facilitate the rotational or turning movement of the valve element 70 with respect to the valve seat 71.

The valve seat 71 and the valve element 70 are retained in the recess 72 by means of a retaining annular plug 73 which has a longitudinal opening 73a therethrough in alignment with the longitudinal opening 10 and the longitudinal opening 70a of the valve element 70 when the valve element 70 is in the open position. The plug 73 has external threads 70b which are in threaded engagement with corresponding threads within the body B. Spanner wrench holes 73c are provided for facilitating the insertion and positioning of the retainer plug 73 in the body B.

The turning or rotation of the valve element 70 is preferably accomplished with a hydraulically actuated gear and rack assembly, the details of which are illustrated in FIGS. 4-6. A housing 75 is provided for the gear and rack mechanism, such housing being secured to the body B by means of conventional threaded studs 75a and nuts 75b (FIG. 4) or any other suitable securing means.

A gear 76 having a square opening 76a therethrough is suitably mounted in the housing 76, preferably with bearing seals 77 and 78 at each side thereof. The gear 76 has gear teeth 76b which mesh with teeth 79a on a sliding rack 79 (FIG. 6) so that as the rack 79 is moved back and forth within a cylinder or bore 75a, the gear 76 is reciprocated, as will be more evident hereinafter.

The rotation or turning movements of the gear 76 are transmitted to the valve element 70 in the preferred form of the invention through an operating shaft 80 which has a square head 80a extending into the square opening 76a of the gear 76 (FIG. 5). The shaft 80 is retained in position within the body B by means of a retaining plug 81 and a thrust washer 81a which act against an annular flange 80b on the shaft 80. Resilient seal rings 80c are preferably provided at the end of the shaft 80 in proximity to the valve element 70 (FIG. 5) to provide a fluid seal with respect to the fluid in the longitudinal passage 10 and the bore 70a of the valve element 70. The inner end 80e of the shaft 80 is also square and fits within a square opening 70b of a valve element 70 so that the valve element 70 is rotated in response to the rotation of the gear 76.

For moving the rack 79, fluid under pressure may be introduced at either end of the rack 79 through fluid pressure tubes 82 which are suitably connected to any type of conventional hydraulic or fluid pressure system. Thus, when fluid pressure is introduced through the inlet tube 82 on the right as viewed in FIG. 6, the rack 79 is moved to the left and thus imparts a clockwise rotation or turning movement to the gear 76. Fluid in the chamber 75a to the left of the rack 79 is discharged through the fluid tube 82 as the rack 79 moves to the left as viewed in FIG. 6. Upon a change in direction of the fluid pressure, the rack 79 is moved to the right, as will be well understood. The fluid pressure system connected with the cylinder or chamber 75a has a bypass valve 82a therewith which is normally closed when the hydraulic system is in use, but which may be opened if the gear 76 is manually or mechanically actuated. For example, the square opening 76a is available for the insertion of a wrench so that the gear 76 may be turned manually. It is to be noted in FIG. 4 that a pointer 76c is formed or marked on the end of the gear 76 so that the operator will know whether the valve element 70 is in the "open" or "closed" positions which are also marked appropriately on the unit.

The ends of the chamber or cylinder 75a are closed by suitable end plugs 75c having spanner wrench opening 75d (FIG. 2). Each of the end plugs 75c preferably carries an adjustable stop screw 83 formed of Teflon or metal, each of which is adjusted by threading same to the desired position so that the valve element 70 is accurately stopped in the fully open position of FIG. 3 or the fully closed position of FIG. 3A.

Also, it is desirable to provide a ball 84 which is resiliently urged by a spring 84a which is held in position adjustably by a threaded insert 84b. The ball 84 is adapted to extend into detent 79a when the valve element 70 is in the closed position (FIG. 6), and in detent 79b, when the valve element 70 is in the open position (FIG. 5). Although the seal rings have not all been marked and identified with numerals, those that are illustrated are exemplary of the seals which are used for confining the fluid pressures as necessary for the operation of the rack 79 in its reciprocatory movement.

In the operation or use of the apparatus or unit of this invention, the shear knives S–1 and S–2 may be operated either with the fluid pressure system or mechanically with the lever 68. For example, the hydraulic or fluid pressure system may be the normal means for operating the knives S–1 and S–2 so that the lever 68 serves as an emergency means for operating same. On the other hand, the knives S–1 and S–2 may be more effectively actuated under some circumstances by using the lever 68 in view of the cam action previously described.

With the unit A of this invention mounted in the hull of the submarine or in some similar location, an antenna C or other similar elongate element may be longitudinally moved through the longitudinal bore 10 and open valve passage 70a when the knives S–1 and S–2 are in the retracted position of FIG. 3.

When it becomes desirable to cut the antenna or other elongate element C, the shear knives S–1 and S–2 are moved towards each other so that their knife cutting edges 25 and 125 cross the center line of the longitudinal opening 10 as illustrated in FIG. 3A to thus shear the antenna or cable C in half. The portion of the antenna which is then extending through the valve opening 70a may be pulled therefrom, and the valve is then actuated to move it from the open position of FIG. 3 to the closed position of FIG. 3A, using either the hydraulic system previously described or a wrench connected to the valve operating gear 76. Such shear and seal unit A thus provides a means for effectively severing an antenna or other elongate element and also closing a valve to prevent the flow of fluid through the longitudinal passage after the elongate element has been severed.

When it is desired to reinsert the elongate element into the longitudinal passage 10 of the body B, the valve element 70 is rotated to the open position of FIG. 3, and the knives S–1 and S–2 are moved to their open or retracted position of FIG. 3. It is to be noted that the full bore is thus available for the passage or movement of the antenna or other elongate object through the longitudinal opening 10 of the body B.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:
1. An apparatus for shearing an elongate element, comprising:
 (a) a body having a longitudinal opening therethrough for receiving the elongate element,
 (b) said body having a lateral opening intersecting said longitudinal opening,
 (c) a first shear knife disposed in said lateral opening on one side of said longitudinal opening,
 (d) a first movable support means mounting said first shear knife of lateral movement into and out of said longitudinal opening,
 (e) a second shear knife disposed in said lateral opening on the opposite side of said longitudinal opening from said first shear knife,
 (f) a second movable support means mounting said second shear knife for lateral movement into and out of said longitudinal opening, and
 (g) means for laterally moving the first movable support means and the second movable support means for moving said first shear knife and said second shear knife laterally towards each other and across the central longitudinal axis of said longitudinal opening for shearing the elongate element in said longitudinal opening and for thereafter returning said shear knives to retracted positions at each side of said longitudinal opening.

2. The structure set forth in claim 1, including:
 (a) a valve disposed in said body and having an opening adapted to be aligned with said longitudinal opening in said body to allow the elongate element to pass through the valve, and
 (b) means for mounting said valve in said body for movement to close said longitudinal opening in said body.

3. The structure set forth in claim 1, including:
 (a) valve seat means in said body surrounding the longitudinal opening and longitudinally spaced from said lateral opening,
 (b) a valve element mounted in said body on said valve seat means, and
 (c) said valve element having a valve opening therethrough of substantially the same diameter as said longitudinal opening in said body and which is adapted to be moved into an open position with said valve opening in alignment with said longitudinal opening in said body and into a closed position with said valve opening substantially 90 degrees to said longitudinal opening in said body.

4. The structure set forth in claim 1, including:
 (a) valve seat means in said body surrounding the longitudinal opening and longitudinally spaced from said lateral opening,
 (b) a valve element mounted in said body on said valve seat means,
 (c) said valve element having a valve opening therethrough of substantially the same diameter as said longitudinal opening in said body and which is adapted to be moved into an open position with said valve opening in alignment with said longitudinal opening in said body and into a closed position with said valve opening substantially 90 degrees to said longitudinal opening in said body,
 (d) a gear operably connected to said valve element for moving said valve element upon a turning of the gear,
 (e) a slidable rack engaged with said gear for turning said gear upon a sliding movement of the rack, and
 (f) means for reciprocating said rack for turning said gear in one direction to move the valve element to the open position and for also turning said gear in the opposite direction to move the valve element to the closed position.

5. The structure set forth in claim 1, wherein:
 (a) said first movable support means has a first knife support member with a first longitudinal passage therethrough,
 (b) said first longitudinal passage has side walls which are laterally spaced from each other a distance greater than the diameter of said longitudinal opening, and
 (c) said first shear knife is supported on said first member and projects laterally inwardly from one of said walls of said first longitudinal passage.

6. The structure set forth in claim 1, wherein:
 (a) said first movable support means has a first knife support member with a first longitudinal passage therethrough,
 (b) said first longitudinal passage has side walls which are laterally spaced from each other a distance greater than the diameter of said longitudinal opening,
 (c) said first shear knife is supported on said first member and projects laterally inwardly from one of said walls of said first longitudinal passage,
 (d) said second movable support means has a second knife support member with a second longitudinal passage therethrough,
 (e) said second longitudinal passage has side walls which are laterally spaced from each other a distance greater than the diameter of said longitudinal opening, and
 (f) said second shear knife is supported on said second member and projects laterally inwardly from one of said walls of said second longitudinal passage which is opposite to said wall of said first knife support member from which said first shear knife extends.

7. The structure set forth in claim 1, wherein:
(a) said first support means has a first rod mounted for lateral sliding movement with respect to said body,
(b) said second support means has a second rod mounted for lateral sliding movement with respect to said body, and
(c) said means for laterally moving the first movable support means and the second movable support means includes:
  (1) a piston on each of said rods, and
  (2) means for applying fluid pressure to said pistons for moving said shear knives towards each other.

8. The structure set forth in claim 1, wherein:
(a) said first support means has a first rod mounted for lateral sliding movement with respect to said body,
(b) said second support means has a second rod mounted for lateral sliding movement with respect to said body, and
(c) said means for laterally moving the first movable support means and the second movable support means includes:
  (1) a lever, and
  (2) means pivotally connecting said lever to each of said rods for moving said shear knives towards each other.

9. The structure set forth in claim 1, wherein:
(a) said first support means has a first rod mounted for lateral sliding movement with respect to said body,
(b) said second support means has a second rod mounted for lateral sliding movement with respect to said body, and
(c) said means for laterally moving the first movable support means and the second movable support means includes:
  (1) a lever,
  (2) means pivotally connecting said lever to each of said rods for moving said shear knives towards each other, and
  (3) a cam formed on said lever for engagement with said body after a partial movement of the shear knives towards each other to thereby provide an increased shearing force.

10. The structure set forth in claim 1, wherein:
(a) said first movable support means has a first knife support member with a first longitudinal passage therethrough,
(b) said first longitudinal passage has side walls which are laterally spaced from each other a distance greater than the diameter of said longitudinal opening,
(c) said first shear knife is supported on said first member and projects laterally inwardly from one of said walls of said first longitudinal passage,
(d) said knife support member having a lateral bore on each end of the same diameter,
(e) an operating rod positioned in one of said lateral bores, and
(f) a guide secured to said body and extending into the other of said lateral bores whereby the fluid forces in the longitudinal opening act on equal areas of said knife support member to avoid fluid pressure in said longitudinal opening imparting movement to said knife support member.

References Cited

UNITED STATES PATENTS

| | | | |
|---|---|---|---|
| 1,913,813 | 6/1933 | Mirick | 30—241 X |
| 3,257,724 | 6/1966 | Wilterdink et al. | 30—228 |
| 3,320,669 | 5/1967 | Chandler et al. | 30—228 |

OTHELL M. SIMPSON, *Primary Examiner.*

J. C. PETERS, *Assistant Examiner.*